Dec. 9, 1969        S. B. WILLIAMS        3,482,302
      METHOD OF MANUFACTURING BELLOWS TYPE
           SEALS USED IN GAS TURBINES
Filed Dec. 21, 1966                    3 Sheets-Sheet 1
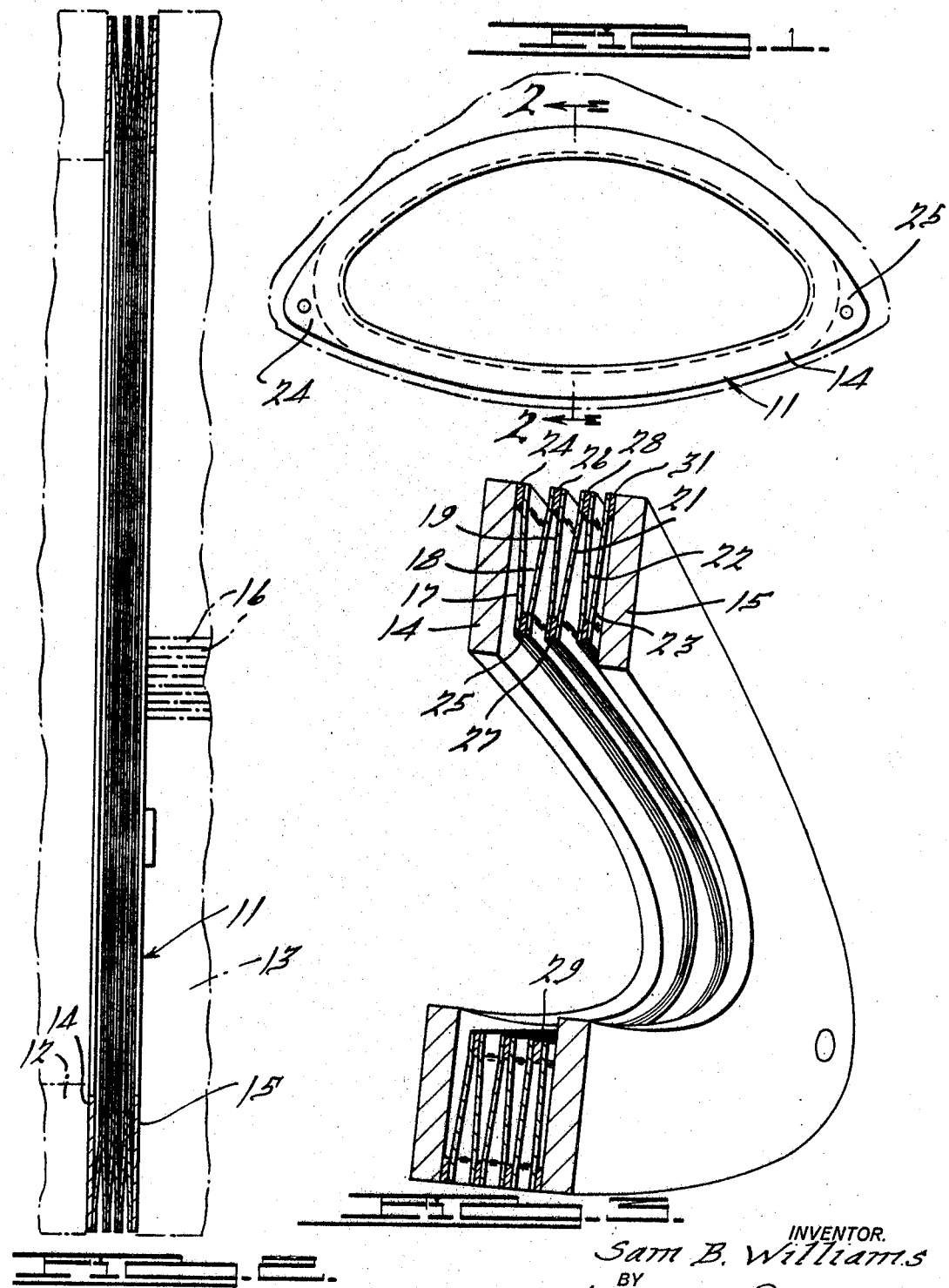
INVENTOR.
Sam B. Williams
BY
Harness, Dickey & Pierce
ATTORNEYS Dec. 9, 1969 S. B. WILLIAMS 3,482,302
METHOD OF MANUFACTURING BELLOWS TYPE
SEALS USED IN GAS TURBINES
Filed Dec. 21, 1966 3 Sheets-Sheet 2
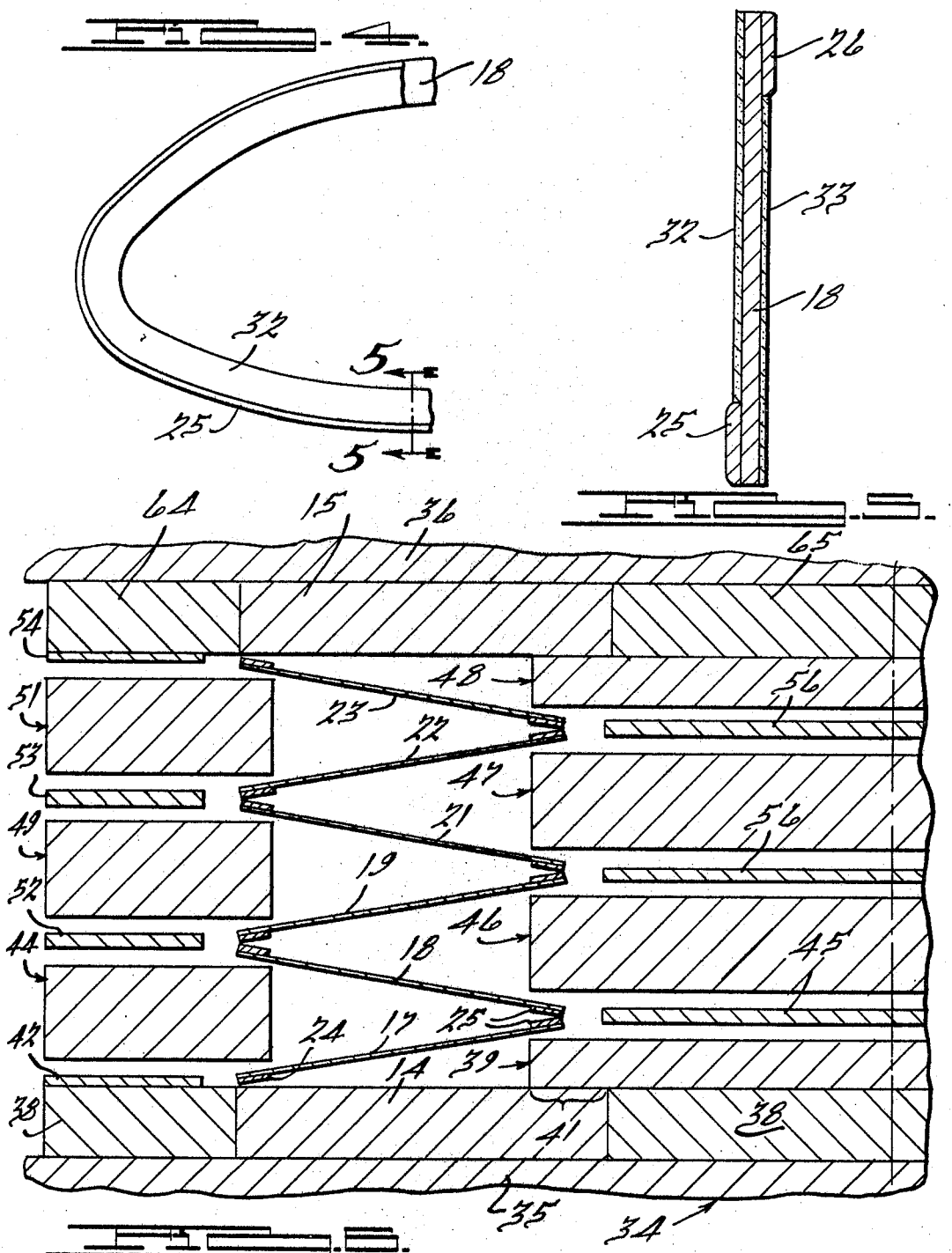
INVENTOR.
Sam B. Williams
BY
Harness, Dickey & Pierce
ATTORNEYS.

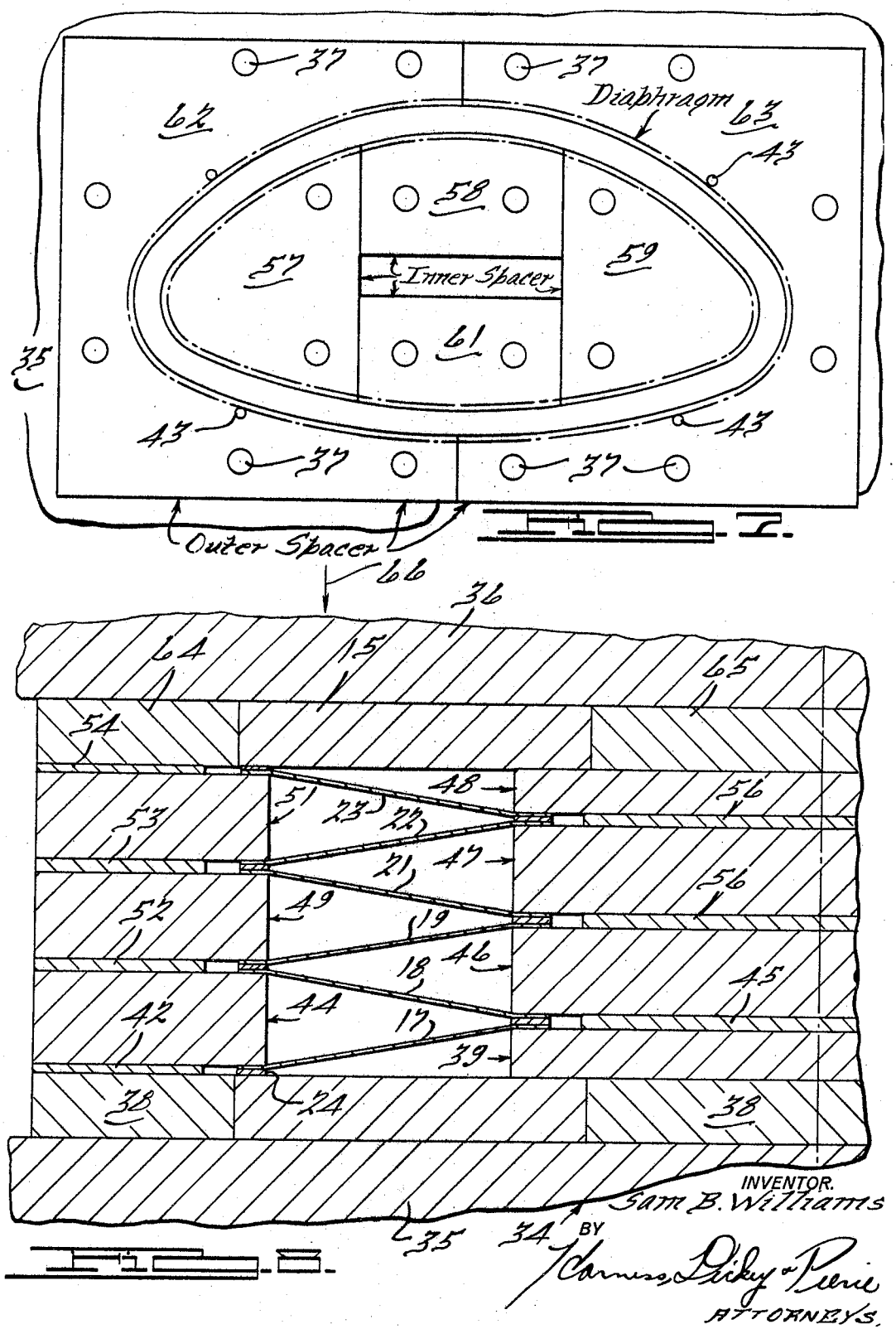

United States Patent Office 3,482,302
Patented Dec. 9, 1969

3,482,302
METHOD OF MANUFACTURING BELLOWS TYPE SEALS USED IN GAS TURBINES
Sam B. Williams, Walled Lake, Mich., assignor to Williams Research Corporation, Walled Lake, Mich., a corporation of Michigan
Filed Dec. 21, 1966, Ser. No. 603,516
Int. Cl. B23k 1/04
U.S. Cl. 29—454
6 Claims

ABSTRACT OF THE DISCLOSURE

This disclosure relates to a method of manufacturing bellows type seals used in gas turbines by brazing the alternate inner and outer edges of a plurality of rings together.

---

This invention relates to gas turbines, and more particularly to a method and apparatus for manufacturing bellows type seals used in connection with rotary matrix regenerators in such turbines.

It is an object of the invention to provide a method and apparatus for producing sheet metal bellows seals of high temperature heat-resistant alloys, while avoiding the necessity of preforming a curvature in the cross sections of the individual bellows layers, thus greatly reducing the cost of manufacture of such bellows seals.

It is another object to provide a low cost method and apparatus of this nature in which the desired curvature in the cross sections of the bellows seal elements will automatically be created when they are assembled for brazing, so that a permanent set may be imparted to the curved bellows sections during the brazing operation.

Other objects, features and advantages of the present invention will become apparent from the subsequent description and the appended claims, taken in conjunction with the accompanying drawings, in which:

FIGURE 1 is a side elevational view of a typical bellows seal which may be manufactured using the method and apparatus of this invention;

FIGURE 2 is an enlarged cross-sectional view taken along the line 2—2 of FIGURE 1 and showing the bellows layers or diaphragms;

FIGURE 3 is a still further enlarged fragmentary prespective view of the bellows, showing the manner in which the diaphragms are brazed to each other;

FIGURE 4 is a partial elevational view of one of the diaphragms showing the brazing alloy and stop-off material applied thereto;

FIGURE 5 is an enlarged cross-sectional view taken along the line 5—5 of FIGURE 4 and showing the brazing alloy and stop-off material;

FIGURE 6 is a cross-sectional view in elevation of a portion of a fixture used to assemble the rubbing shoe, static shoe and diaphragms, this figure also showing the shoe guides, spacers and shims, the parts being shown in spread-apart position before they are squeezed together;

FIGURE 7 is a top plan view of the fixture with parts omitted, showing the manner in which the inner and outer spacers are constructed so that they may be removed; and FIGURE 8 is a view similar to FIGURE 6 but showing the parts in squeezed-together position ready for brazing.

Briefly, the illustrated embodiment of the invention comprises the manufacture of flat stampings of a rubbing shoe, static shoe, and a plurality of diaphragms or bellows sections for a somewhat elliptically shaped closed loop seal to be disposed between the stationary part of a gas turbine duct and a rotary matrix regenerator so that, for example, compressed air may flow through the open face surrounded by the seal. The diaphragms are of a high temperature heat-resistant alloy, and in the form of flat sheet metal stampings. By means of masking, brazing material is applied to alternate inner and outer edges of the stampings, and stop-off material (to prevent flow of the brazing material across the face of the bellows sections) is applied to the bellows section faces, as well as to the rubbing and static shoes.

The assembly of shoes and diaphragms is then stacked in a fixture together with shoe guides, spacers and shims, all these being located relative to the base and cover plates of the fixture by means of dowel pins. The spacers alternately overlap the inner and outer edges of the diaphragms and are of sufficient thickness so that when the assembly is squeezed together, the diaphragms will be distorted, the spacers thus determining the corrugation height of the finished seal. The shims are placed between the spacers to compensate for the thickness of the braze joints and overlapping diaphragm edges.

The squeezed-together assembly is then subjected to the normal brazing cycle. The heat in this cycle will range somewhere between 1800° and 2200° F. and will cause the diaphragms to acquire a permanent set in their distorted shape.

After brazing, the spacers and shims are removed. For this purpose the spacers, which overlap the diaphragm edges, are made in segments so that they may be slid out of position. The seal is then finished. If necessary, the desired physical properties of the bellows can then be obtained by heat treating the finished assembly.

Referring more particularly to the drawings, a bellows seal is generally indicated at 11 and comprises a closed loop of somewhat elliptical shape but having one side of sharper curvature than the other, as seen in FIGURE 1. The seal is adapted to be disposed between a gas turbine duct shown in dot-dash lines at 12 in FIGURE 2, and a rotary matrix type of heat exchanger shown in dot-dash lines at 13. The duct and heat exchanger have flat facing surfaces between which seal 11 is disposed, the seal having a static shoe 14 engageable with duct 12 and a rubbing shoe 15 engageable with matrix 13. The rotary matrix is provided with many small passages 16 extending in the direction of its axis of rotation, as seen in FIGURE 2, and the area surrounded by the seal will permit gases to flow between these passages and duct 12.

The seal is constructed by a series of bellows diaphragms 17, 18, 19, 21, 22 and 23, as seen in FIGURE 3, disposed between shoes 14 and 15. The shoes and diaphragms all have the somewhat elliptical shape described above, except that the shoes are provided with ears 24 and 25 for facilitating attachment to the stationary portion of the gas turbine.

The diaphragms are fabricated of a high temperature heat-resistant alloy. Three basic types of such alloys normally used for seals of this type are chromium-nickel steels, nickel base alloys and cobalt base alloys. The diaphragms are joined to each other alternately at their inner and outer edges, and the two end diaphragms 17 and 23 are joined to the static and rubbing shoes respectively, at their outer edges. These joints are made by brazing alloys such as chromium-nickel, silver base or copper base types. The brazing material which joins static shoe 14 to bellows diaphragm 17 is indicated at 24, and the brazing materials joining successive diaphragms to each other are indicated at 25, 26, 27, 28 and 29, the material joining diaphragm 23 to static shoe 15 being indicated at 31.

The braze cycle normally includes placing the assembly in a brazing oven which may be of the vacuum, inert gas or reducing gas type, and heating the assembly to a range of between 1800° and 2200° F., depending upon the particular brazing alloy used. The brazing alloy melts and bonds the bellows diaphragm to each other and to the static and rubbing shoes.

Because there is a definite space between duct 12 and matrix 13 which must be tightly occupied by seal 11, it has been necessary in the past, when stamping out diaphragms 17 through 23, to form a curvature in the cross-sectional shape of these diaphragms such that their inner and outer edge portions, while being parallel to each other, will be shifted from each other in the direction of the matrix axis. This procedure greatly increases the cost of fabricating these parts. According to the present invention, bellows diaphragms 17 through 23 may be made as flat stampings, and the desired curvature in their cross sections is obtained through the brazing cycle.

In carrying out the seal manufacturing method according to the invention, after the flat stampings of the hubbing shoe, static shoe and diaphragms have been made, brazing alloy and stop-off material are applied to these parts. Both of these materials are of a paste-like nature when applied. As indicated previously, the stop-off material is to prevent the brazing material from running along the faces of the parts during the brazing cycle, and is removed in the final cleaning process.

FIGURES 4 and 5 show a typical diaphragm 18 with brazing material 25 along the left hand side of its inner edge portion (FIGURE 5) and brazing material 26 along the right hand side of its outer edge portion. Stop-off material 32 is applied to the left hand side of diaphragm 18 in FIGURE 5 except for the portion occupied by material 25, and stop-off material 33 is applied to the right hand side of the diaphragm except for where material 26 is located. The stop-off and brazing material may be applied by using appropriately shaped masks (not shown). Stop-off material will also be applied to the static and rubbing shoes except where they are to be brazed to their respective diaphragms 17 and 23.

The parts are then stacked in a fixture shown partially in FIGURES 6 and 8. This fixture is generally indicated at 34 and comprises a base plate 35, a cover plate 36, and a plurality of dowel pins 37 (FIGURE 7) extending between the base and cover plates.

Static shoe 14 is first placed on base plate 35, shoe guides 38 being placed on opposite sides of shoe 14 to hold it in position. Guides 38 are of the same thickness as shoe 14 and are engageable with its inner and outer edges, as seen in FIGURES 6 and 8.

Next, a first set of spacers, generally indicated at 39, is placed in fixture 34, lying over inner shoe guide 38 and overlapping the inner edge portion 41 of static shoe 14, as indicated in FIGURE 6. Spacer 39 is actually made of four parts, as will be later described. A shim 42 is placed on outer shoe guide 38. The flat stamping which will form diaphragm 17, with the stop-off and brazing material applied (stop-off material is not shown in FIGURES 6 and 8 for purposes of clarity), is then placed in the fixture. Four dowel pins 43 of smaller diameter than pins 37 are provided in fixture 34 for properly locating the diaphragms by engagement with their outer edges, as seen in FIGURE 7.

The dimensions of shim 42 relative to diaphragm 17 are such that shim 42 will surround the diaphragm and be spaced outwardly therefrom. The thickness of shim 42 is equal to the desired thickness of the braze joint to be formed by material 24, plus the thickness of diaphragm 17. Spacer 39 on the other hand is substantially thicker than shim 42, and its thickness will determine the corrugation height of the diaphragm 17 after a brazing cycle has been completed. The outer edge of spacer 39 overlaps the inner edge of diaphragm 17 by about the same distance as that occupied by brazing material 25, so that the inner edge of diaphragm 17 will rest on the outer edge of spacer 39.

An outer spacer generally indicated at 44 is then placed in fixture 34. This spacer is likewise sufficiently thick to create the desired corrugation height, this time of the next diaphragm 18. Spacer 44 rests on shim 42, and its inner portion overlaps the outer edge portion of diaphragm 17 about the same distance as that occupied by braze material 24. Spacer 44 is considerably thicker than spacer 42, since it must extend through the corrugation heights of diaphragms 17 and 18.

An inner shim 45 is placed on inner spacer 39. This shim will compensate for the thickness of braze material 25 plus the thicknesses of diaphragms 17 and 18; it is thus somewhat thicker than shim 45. Its outer edge is spaced inwardly from the inner edge of diaphragm 17.

Diaphragm 18 will next be placed in the fixture, so that its inner edge rests on the inner edge of diaphragm 17 and its outer edge rests on the inner portion of spacer 44.

In like manner, successive inner spacers generally indicated at 46, 47 and 48, successive outer spacers generally indicated at 49 and 51, successive outer shims 52, 53 and 54, and successive inner shims 55 and 56 will be placed in the fixture, along with diaphragms 19, 21, 22 and 23, all as seen in FIGURE 6. The sequence of placing these parts in fixture 34 will be such that they will overlap in the manner shown. Actually, when the parts are placed in the fixture, and before they are squeezed together, they will not have exactly the disposition shown in FIGURE 6, since the force of gravity will cause them to settle to a certain extent. However, this figure is believed to bring out more clearly the functioning of the arrangement, especially insofar as creating the curvatures of the diaphragm cross sections is concerned.

Both the inner and outer set of spacers are provided with holes to receive dowel pins 37 and 43. Furthermore, the spacers are made up of segments to facilitate their removal after the brazing cycle is over. More particularly, the inner spacers 39, 46, 47 and 48 are each made up of four parts, and the outer spacers 44, 49 and 51 are each made up of two parts. The four parts of each inner spacer are shown in FIGURE 7 and are indicated at 57, 58, 59 and 61. Segments 57 and 59 occupy the ends of the somewhat elliptically shaped area surrounded by the seal, and segments 58 and 61 occupy the intermediate portions. The latter two segments are spaced from each other. After the brazing cycle is over, the dowel pins may be removed and segments 58 and 61 slid toward each other, thus withdrawing them from their overlapping engagement with the inner edge portions of the diaphragms. These segments may then be lifted out, and segments 57 and 59 slid toward each other and lifted out in the same manner. The two segments of each outer spacer are indicated at 62 and 63 in FIGURE 7. These may be slid away from each other (to the left and right in FIGURE 7) to withdraw them from overlapping engagement with the outer edge portions of their respective diaphragms, after first removing dowel pins 37 and 43.

The assembly in fixture 34 is completed by placing rubbing shoe 15 in position, together with an outer shoe guide 64 and an inner shoe guide 65. Cover 36 is then placed in position and a weight (represented by an arrow 66 in FIGURE 8) is placed on the cover. The parts will be forced together, and the diaphragms deformed as shown in FIGURE 8. At this time, before brazing, the diaphragms may not have been deformed beyond their elastic limit. However, it will be noted that the inner and outer edge portions of the diaphragms will be parallel to each other so as to properly engage the brazing material, whereas the intermediate portions of the diaphragms will be successively deformed to achieve the proper total seal thickness.

Fixture 34 will then be placed in the brazing oven and the entire assembly subjected to brazing temperature for the desired period. This temperature and time will be sufficient to cause diaphragms 17 through 23 to assume a permanent set in their distorted position.

After the brazing cycle is completed, the cover plate, shoe guides, spacers and shims will be removed. The finished seal will be as shown in FIGURES 1, 2 and 3. The desired physical properties in the seal bellows may then be obtained by heat treating the finished assembly if desired. The finished seal will thus have the desired springiness in the direction of the matrix axis.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a method for manufacturing a seal of the type having a series of sheet metal bellows diaphragms made of high temperature heat-resistant alloy and brazed to each other alternately along their inner and outer edge portions, the steps of forming said diaphragms in spaced parallel relationship as flat members, applying brazing material to alternate inner and outer edge portions of the diaphragms, stacking said diaphragms, squeezing together the alternate inner and outer edge portions of said diaphragms which are to be brazed together, causing the inner and outer edge portions of each diaphragm to be shifted out of the same plane into spaced planes so that the intermediate portion of each diaphragm will be distorted, whereby the entire series of diaphragms will assume a corrugation-like effect with a total thickness substantially greater than the total thickness of the individual diaphragms, and subjecting the entire assembly of diaphragms, while so squeezed and distorted, to a brazing cycle with sufficient heat to braze the diaphragm edge portions together and at the same time cause the distorted diaphragms to assume a permanent set in their distorted position.

2. The method according to claim 1, with the further step of applying stop-off material to the surfaces of said diaphragms which are not to be brazed before the brazing cycle, and removing said stop-off material after the brazing cycle.

3. The method according to claim 1, with the further steps of applying brazing material to outwardly facing edge portions of the diaphragms at the opposite ends of said series of diaphragms, holding shoes against said last-mentioned edge portions, and thereby brazing said shoes to said last-mentioned edge portions during the brazing cycle.

4. The method according to claim 1 in which said diaphragms are formed as closed loops.

5. The method according to claim 1 in which said diaphragms are fabricated of material chosen from the group consisting of chromium-nickel steels, nickel base alloys and cobalt base alloys.

6. The method according to claim 1 in which the temperature in said brazing cycle is between 1800° and 2200° F.

References Cited

UNITED STATES PATENTS

| | | | |
|---|---|---|---|
| 1,717,196 | 6/1929 | Emmet | 29—454 |
| 1,940,850 | 12/1933 | Derby | 29—472.3 |
| 2,084,496 | 6/1937 | Lockwood. | |
| 2,534,123 | 12/1950 | Hasselhorn | 29—454 X |
| 3,100,256 | 8/1963 | Borg | 29—454 X |
| 3,119,418 | 1/1964 | Rayniak | 29—472.3 X |
| 3,277,927 | 10/1966 | Schneider | 29—454 X |

FOREIGN PATENTS

| | | |
|---|---|---|
| 856,681 | 12/1960 | Great Britain. |
| 995,453 | 6/1965 | Great Britain. |

CHARLIE T. MOON, Primary Examiner

U.S. Cl. X.R.

29—472.3; 92—45; 285—226; 277—200

PO-1050
(5/69)

UNITED STATES PATENT OFFICE
CERTIFICATE OF CORRECTION

Patent No. 3,482,302      Dated December 9, 1969

Inventor(s)     S. B. Williams

It is certified that error appears in the above-identified patent and that said Letters Patent are hereby corrected as shown below:

Column 3, line 15, "through" should read --during--.

Column 5, lines 19 and 20, cancel "in spaced parallel relationship"; line 22, after "said diaphragms" insert --in spaced parallel relationship--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents